United States Patent

Apicella, Jr. et al.

[15] 3,701,124

[45] Oct. 24, 1972

[54] APPARATUS TO EFFECT IMPROVED READOUT OF MEMORY ELEMENTS

[72] Inventors: Anthony M. Apicella, Jr., Massillon; Jon M. Surprise, Akron, both of Ohio

[73] Assignee: Goodyear Aerospace Corporation, Akron, Ohio

[22] Filed: July 1, 1970

[21] Appl. No.: 51,469

[52] U.S. Cl. .340/174 RC, 340/174 DC, 340/174 M, 340/174 PW, 340/174 TF, 340/174 WA

[51] Int. Cl. .......G11c 7/02, G11c 11/04, G11c 11/14

[58] Field of Search ..340/174 PW, 174 RC, 174 WA

[56] References Cited

UNITED STATES PATENTS 3,229,263 1/1966 Luebbe, Jr. et al..340/174 RC

OTHER PUBLICATIONS

IBM Technical Disclosure Bulletin; Vol. 10; No. 1 June, 1967; pg. 40

*Primary Examiner*—James W. Moffitt
*Attorney*—J. G. Pere and L. A. Germain

[57] ABSTRACT

The invention provides an improved signal to noise ratio for readout of memory elements. Essentially, the idea comprises apparatus associated with a memory element to act coincident with the normal interrogation of the memory element to provide a dynamic electrical bias coincident with the electrical signal induced as a result of flux change in the memory element caused by interrogation, which dynamic bias signal will always be in a known direction, and will either add to or subtract from the electrical signal representing flux change in the memory element during interrogation so as to either enhance or substantially eliminate the electrical readout signal from the memory element. With the application of proper logic in the sense determination of the electrical readout signal from the memory element, the information stored in the memory element is thereby determined with a significant improved resultant in signal to noise ratio.

2 Claims, 4 Drawing Figures

INVENTORS
ANTHONY M. APICELLA, JR.
JON M. SURPRISE

BY:
Oldham & Oldham
ATTORNEYS

INVENTORS
ANTHONY M. APICELLA, JR.
JON M. SURPRISE
BY:
Oldham & Oldham
ATTORNEYS

APPARATUS TO EFFECT IMPROVED READOUT OF MEMORY ELEMENTS

Heretofore it has been known that memory elements are utilized in computers and associative memories to store digital data as bits of information. Readout of this information represented as flux paths in the memory elements is normally achieved destructively or non-destructively by an electric current passing through a wire which is associated with the memory element. Some times the memory elements are individual or separate components which are arranged to form words or memory storage banks or units. More recently, however, the use of plated wire has allowed the memory elements to be actually represented by small permalloy deposits on an electrically conductive wire. With each wire then representing one word of memory, the arrangement of the wires can form the memory storage bank. Normally, interrogation or readout of the memory elements or the individual units on the plated wire is achieved non-destructively by some solenoid type winding surrounding the element tending to cause a flux shift in the element upon the pulse of an electric current through the interrogation winding without destructively changing the flux pattern in the element. This solenoid type interrogation, however, always produces two flux changes at spaced times and in opposite directions. Further, the flux change caused by solenoid type interrogation is normally relatively small, and sometimes, because of the very small currents involved, it is extremely difficult to interpret if any electrical noise is present in the sense pickup. Further, the usual practice is to read only one of the two equal, but opposite pulses generated at a spaced time interval when a solenoid interrogation is utilized, and this means that the pulse not read may tend to cause noise and confusion to other readings, particularly when these readings are made at very closely spaced time intervals, and for small magnitude electrical pulses.

Therefore, it is the general object of the present invention to avoid and overcome the problem of reading out memory elements by providing apparatus to selectively dynamic bias the interrogation readout signals to thereby substantially enhance the signal to noise ratio, and insure more reliability in the system, as well as less sensitive equipment requirements because of enhanced signal to noise ratios.

A further object of the invention is to provide an extremely simple and quite flexible dynamic bias system to act coincident with the normal interrogation of memory elements which will significantly enhance the signal to noise ratio without detracting from the operation of the system, either as to time, or cost requirements.

The aforesaid objects of the invention and other objects which will become apparent as the description proceeds are achieved by providing apparatus to enhance the sense signal upon bit interrogation from a digital memory storage element which comprises means to effect interrogation of the element, means to sense flux changes during such interrogation as an electrical signal, and means to superimpose an electrical bias onto the sensed electrical signal in a predetermined direction at a time coincident with the sensed electrical pulse representing flux change within the element.

For a better understanding of the invention, reference should be had to the accompanying drawings wherein FIG. 1A is a graphic illustration of a dynamic bias pulse added to enhance the signal readout;

Figure 1A:
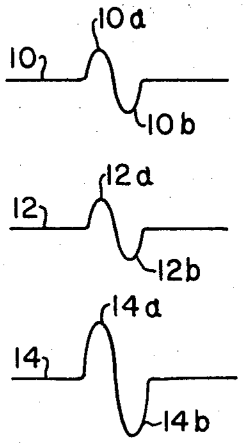
FIG. 1B is a graphic illustration of a dynamic bias pulse added to detract or essentially cancel the resultant signal output.
Figure 1B:
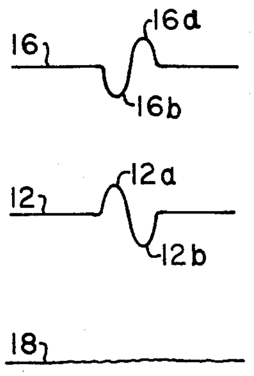

With respect to the graphic illustrations of FIGS. 1A and 1B, it should be understood that the purpose of the invention is to increase the mis-match signal from a memory element readout at the sense amplifier input, or at the sense amplifier itself so as to provide an increased mis-match signal to improve the overall array system signal to noise ratio.

Particularly, FIG. 1A illustrates by signal 10 how the electrical signal on the sense line associated with a memory element would look if a solenoid type interrogation were applied thereto. Note that a positive pulse 10*a* and a negative pulse 10*b* are produced. This type of signal is well known and understood by those skilled in the art. The essence of the invention is then achieved by providing a superimposed electrical signal on the sense line associated with the memory element that will give a dynamic bias or suppression to the sense signal. A typical signal is illustrated by line 12 which includes a positive pulse 12*a* that occurs in coincidence or phase with pulse 10*a* of signal 10 and a negative pulse 12*b* also corresponding with pulse 10*b*. This is a dynamic bias and it may be applied directly to the sense line or to the sense amplifier as defined hereinbelow with respect to the discussion of typical apparatus. In any event, it should be quite clearly understood by those skilled in the art that the sense line output resultant illustrated by numeral 14 will include a greatly enlarged positive pulse 14*a* and negative pulse 14*b*.

The invention contemplates that the dynamic bias illustrated by signal 12 will always be in the same direction, and normally in a solenoid type interrogation will be coincident with the forward or leading pulse of the two equal and opposite pulses. However, it should be understood that the dynamic bias could coordinate with the trailing pulse in a solenoid type non-destructive readout just as well. Naturally, where the readout is not solenoid actuated, and only a single pulse is represented on the sense line, the dynamic bias must coordinate by being coincident or in phase with this singular pulse.

FIG. 1B illustrates the reverse situation of FIG. 1A, namely the memory element containing the opposite flux state where a solenoid interrogation will produce a sense signal 16 having a leading negative pulse section 16*a* and a trailing positive pulse section 16*b*, again as well understood by those skilled in the art. Again, the same dynamic pulse 12 is applied that includes positive pulse 12*a* and negative pulse 12*b*. The resultant signal 18 in this case has a cancellation between pulses 16*b* and 12*a* and 16*a* and 12*b* which are coincident or in phase with each other making the signal flat throughout this portion.

APPARATUS CONFIGURATION

Figure 2:
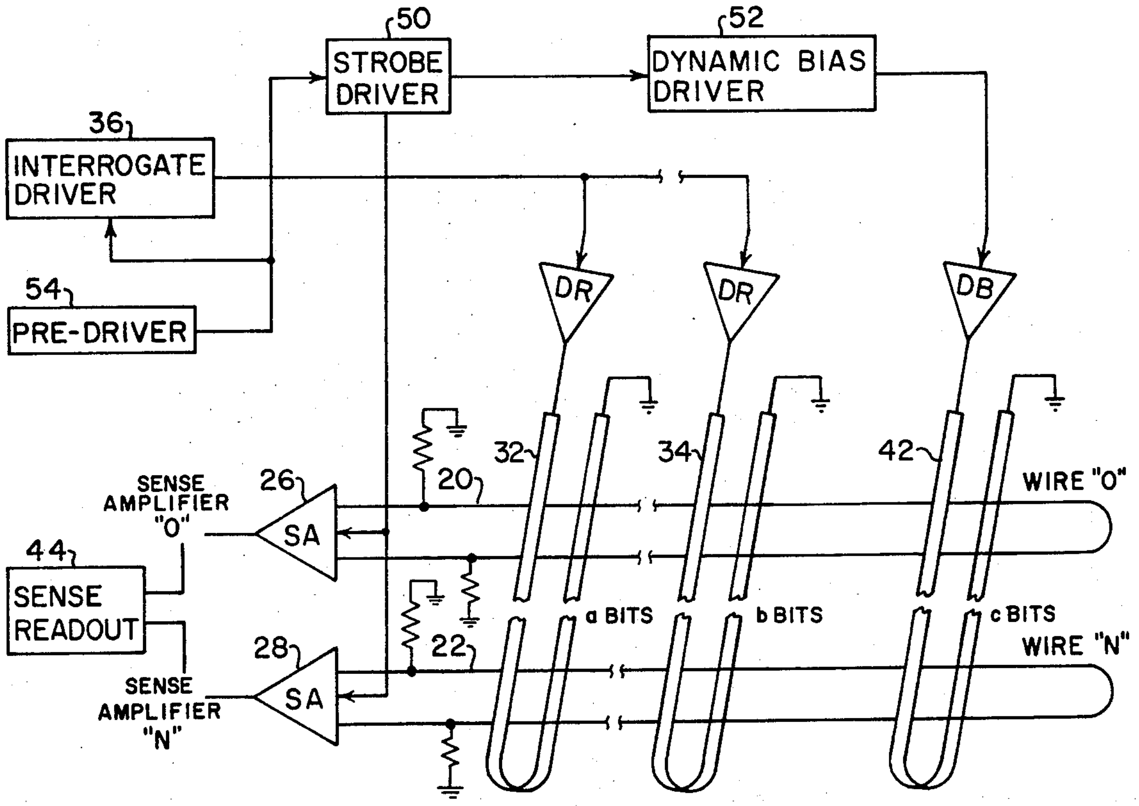
FIG. 2 is a block diagram schematic illustration of the dynamic bias technique employed in a preferred embodiment of the invention.

A typical apparatus to implement the dynamic bias according to the graphic illustrations in FIGS. 1A and 1B is illustrated in FIG. 2. Specifically, two sections of plated wire are indicated by numerals 20 and 22, respectively, which carry plated memory elements deposited directly onto the wire. This type of plated wire is also well known and understood by those skilled in the art. Each of the plated wires 20 and 22 feeds into a respective sense amplifier 26 and 28 in the conventional manner. In effect, the wires 20 and 22 act as sense lines. Solenoid wound bit aligned straps are represented by numeral 32 for association with the *a* bits, and by numeral 34 for association with the *b* bits or elements. The *c* bits do not include an interrogate winding as such since they constitute the unused bits of each of the plated wires that will cooperate to form the dynamic bias as defined further hereinbelow. It should be understood however, that the interrogation straps wound in solenoid fashion are conventional, and the winding and driving thereof with an appropriate interrogate driver 36 is well understood by those skilled in the art.

The conventional completion of the circuitry of the invention is achieved by utilizing the sense amplifiers 26 and 28, respectively, to feed into a sense readout indicated by block 44. It should be understood that in the usual system, there will be many more plated wires and many more bits on each wire with this being appropriately indicated in FIG. 2 by the brakes on the schematic block diagram. However, a respective sense amplifier is associated with each plated wire in the usual manner.

The essence of the invention is achieved by a strobe driver section 50 coordinating with a dynamic bias driver 52 to effect a dynamic bias drive into an unused solenoid wound driver 42 associated with the c bits. The dynamic bias driver 52 sends an electrical pulse through the driver 42 to generate the always positive directed pulse 12*a* onto the sense wires or plated wires 20 and 22, respectively, as shown in FIGS. 1A and 1B.

In order to coordinate the timing between the interrogate driver 36 and the dynamic bias driver 52 to insure coincidence or in phase relation between the respective pulses as indicated in FIGS. 1A and 1B, a predriver 54 initiates the pulses from the interrogate driver 36 and strobe driver 50 in properly timed coordination so that this coincident pulse configuration occurs. The details of such coincident timing are well understood by those skilled in the art.

The effect of this dynamic bias is to increase the signal detected by the sense amplifiers and reduce noise signals. Hence, the application of the dynamic bias improves the signal to noise ratio of the array signal.

Figure 3:
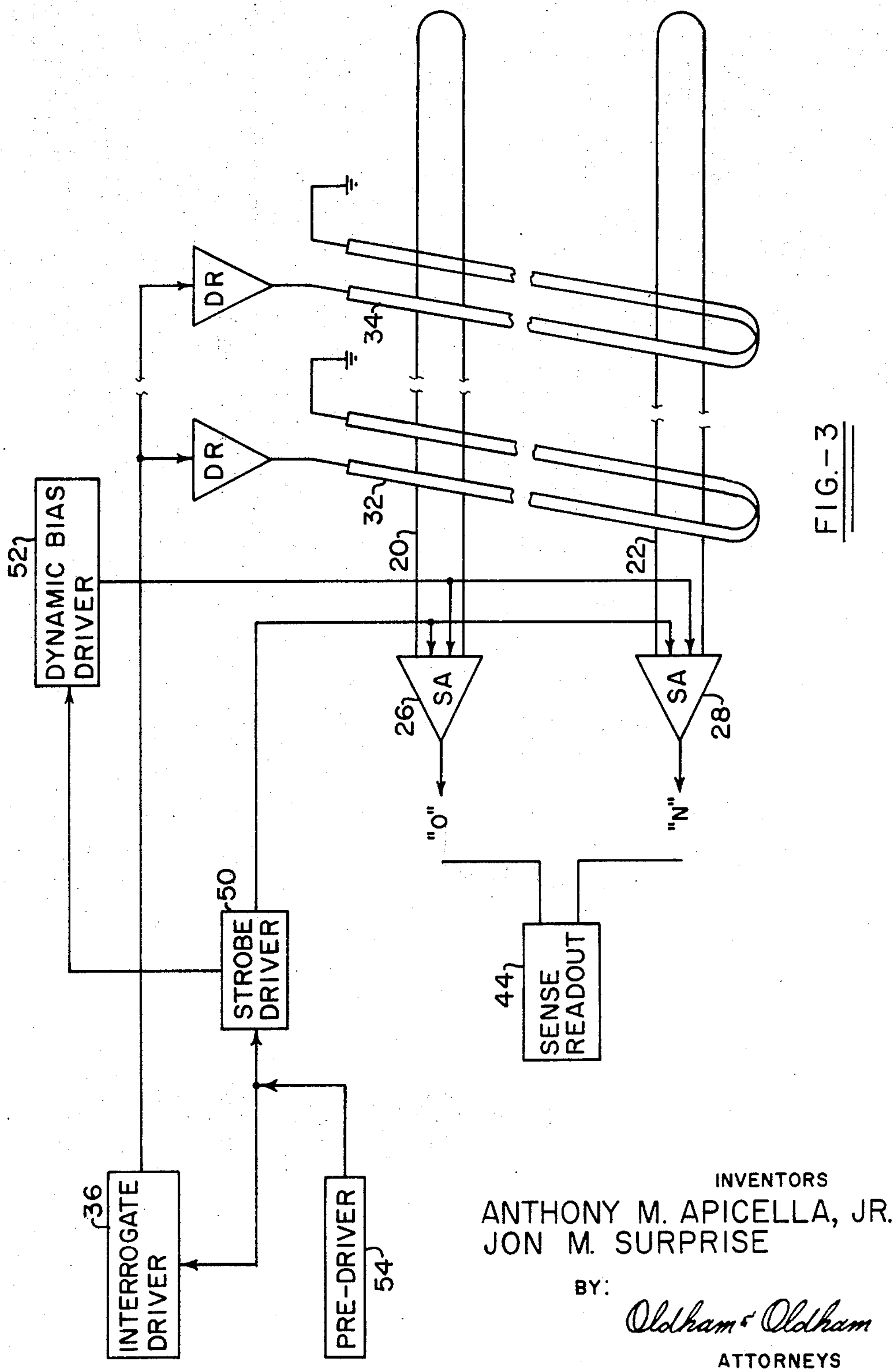
FIG. 3 is a block diagram schematic of the dynamic bias technique employed in a modified embodiment of the invention.

FIG. 3 illustrates a slightly modified embodiment quite similar to FIG. 2 except that the dynamic bias driver actually feeds directly into the sense amplifiers 26 and 28, rather than through an unused strap driver. The same numerals are used because the same components are involved with a different wiring relationship. The signal is also properly timed through the predriver 54 and strobe driver 50 to thereby coordinate an in phase relationship with the signals sensed on wires 20 and 22 so that the same improvements noted above are achieved.

Thus, it should be seen that the objects of the invention have been achieved by providing a dynamic bias in association with the normal sense readout for digital memory storage elements to enhance those signals in the same direction as the dynamic bias and suppress those in opposition thereto. Naturally, the sense readout 44 will look for either the enhanced signal to represent a one, for example, and no signal to represent zero. In this manner, minor noise variations in the line do not effect the performance of the readout. The exact manner in which the dynamic bias is applied can vary in accordance with the embodiment shown in FIGS. 2 and 3, or other similar type adaptations to still accomplish the same purpose of the invention, and the invention contemplates all other techniques to achieve the application of bias to enhance readout.

While in accordance with the Patent Statues only the preferred embodiment of the invention has been illustrated and described in detail, it is to be particularly understood that the invention is not limited thereto or thereby, but that the inventive scope is defined in the appended claims.

What is claimed is:

1. A digital memory storage bank comprising:

a plurality of conductors each of which carries a number of discreet bit means to store digital information;

interrogation means for effecting a non-destructive simultaneous interrogation of at least one bit means of each conductor by the production of a flux change at the respective bit means;

means to effect a non-destructive simultaneous flux change in at least one bit means of each conductor which bit means is not interrogated by the interrogation means, the means to effect a flux change operating in coincidence with the interrogation means; and means to simultaneously sense the flux change induced currents in each conductor, such means being controlled so as to be operative only in coincidence with the interrogation means.

2. A digital memory storage bank comprising:

a plurality of conductors each of which carries a number of discreet bit means to store digital information;

interrogation means for effecting a non-destructive simultaneous interrogation of at least one bit means of each conductor by the production of a flux change at the respective bit means;

a circuit means to create, external to the conductors which carry the discreet bit means, pulses in coincidence with the current pulses created by the flux change of the bit means; and a means, controlled so as to be operative only in coincidence with the interrogation means, to simultaneously sense the pulses created by the circuit means and those created by the flux change of the bit means such that in certain predetermined instances the pulses will enhance each other while in others the pulses will regate each other.

* * * * *